(12) United States Patent
DeJule (10) Patent No.: US 9,655,454 B2
(45) Date of Patent: May 23, 2017

(54) SYSTEM USABLE IN ARTICLES TO FACILITATE RELATIVE MOVEMENT BETWEEN PARTS THEREOF

(71) Applicant: Aaron DeJule, River Forest, IL (US)

(72) Inventor: Aaron DeJule, River Forest, IL (US)

( * ) Notice: Subject to any disclaimer, the term of this patent is extended or adjusted under 35 U.S.C. 154(b) by 61 days.

(21) Appl. No.: 14/462,150

(22) Filed: Aug. 18, 2014

(65) Prior Publication Data

US 2015/0048667 A1 Feb. 19, 2015

Related U.S. Application Data

(60) Provisional application No. 61/866,626, filed on Aug. 16, 2013, provisional application No. 61/887,693, filed on Oct. 7, 2013.

(51) Int. Cl.
| | |
|---|---|
| *B60N 2/00* | (2006.01) |
| *A47C 7/00* | (2006.01) |
| *F16H 21/00* | (2006.01) |
| *A47C 1/02* | (2006.01) |

(52) U.S. Cl.
CPC ............... *A47C 7/00* (2013.01); *A47C 1/02* (2013.01); *F16H 21/00* (2013.01); *Y10T 74/20* (2015.01)

(58) Field of Classification Search
CPC .. A47C 7/00; A47C 1/02; F16H 21/00; Y10T 74/20
USPC .......................... 297/354.1, 350, 351, 440.12
See application file for complete search history.

(56) References Cited

U.S. PATENT DOCUMENTS

| | | | | |
|---|---|---|---|---|
| 3,053,569 A | * | 9/1962 | Clark, Jr. | A47C 5/005 |
| | | | | 297/111 |
| 3,359,036 A | * | 12/1967 | Druth | A47C 1/146 |
| | | | | 108/46 |
| 3,519,307 A | * | 7/1970 | Gittings | A47C 5/005 |
| | | | | 297/183.5 |
| 4,385,782 A | * | 5/1983 | Clark, Jr. | A47C 5/005 |
| | | | | 297/350 |
| 6,237,845 B1 | | 5/2001 | Hashimoto et al. | |
| 6,595,409 B2 | | 7/2003 | Hashimoto et al. | |
| 6,644,694 B2 | | 11/2003 | Seawright | |
| 7,060,092 B2 | | 6/2006 | Kuribayashi et al. | |
| 7,334,619 B2 | | 2/2008 | Kishida | |
| 8,740,308 B2 | * | 6/2014 | Leywood | A47C 5/005 |
| | | | | 297/440.12 |
| 2004/0195887 A1 | * | 10/2004 | Kassai | A47D 1/00 |
| | | | | 297/354.1 |
| 2005/0121124 A1 | | 6/2005 | Tsubono | |

(Continued)

*Primary Examiner* — Jose V Chen
(74) *Attorney, Agent, or Firm* — Wood, Phillips, Katz, Clark & Mortimer (57) ABSTRACT

A system that makes up at least a portion of a utilitarian article and having: a first body; a second body; and a first linkage assembly acting between the first and second bodies and configured to allow the first and second bodies to be relatively positioned to thereby reconfigure the article into which the system is incorporated. The first linkage assembly has first and second linkage parts. The first linkage assembly is configured so that: a) the first linkage part is movable relative to the first body around a first axis; b) the second linkage part is movable relative to the first linkage part around a second axis; and c) the second linkage part is movable relative to the second body around a third axis. At least one of the first, second, and third axes is non-parallel to the other two of the first, second, and third axes.

19 Claims, 7 Drawing Sheets

(56) References Cited

U.S. PATENT DOCUMENTS

2007/0012348 A1 1/2007 Hoberman
2009/0250984 A1* 10/2009 Maier .................. B60N 2/062
  297/232
2011/0304183 A1* 12/2011 Van Hekken ............ A47C 3/12
  297/313

* cited by examiner

150
SYSTEM USABLE IN ARTICLES TO FACILITATE RELATIVE MOVEMENT BETWEEN PARTS THEREOF

CROSS-REFERENCE TO RELATED APPLICATIONS

This application is a non-provisional of U.S. Application No. 61/866,626, filed Aug. 16, 2013, and U.S. Application No. 61/887,693, filed Oct. 7, 2013.

BACKGROUND OF THE INVENTION

Field of the Invention

This invention relates to articles having relatively movable parts and, more particularly, to a system incorporated into such an article to guide relative movement between those parts.

Background Art

A multitude of articles, in many different fields, incorporate parts that are movable relative to each other to reconfigure the article to change how the article performs, is shaped, and/or interacts with a user. One example of such an article is an adjustable desk chair having a seat, back rest, and armrest.

Designers of desk chairs often strive to come up with a "one size fits all" version. At the same time, users of these chairs have come to expect a high degree of adjustability, to include changing the heights of the seat, back rest, and armrests, and changing the angular relationship between the seat and back rest. Ideally, the component parts of such chairs would move to precisely follow specific torso and limb movements as the user changes positions while remaining seated.

Most commonly, the mechanisms that are utilized for the above purpose are those that permit translational movement between the parts and those that permit pivoting movement of the parts, one relative to the other. For example, back rests are commonly pivoted relative to a supporting frame/base about a horizontal, laterally extending axis between upright and reclined positions. Armrests are typically made to translate in a vertical line relative to the supporting frame to which the seat and back rest are mounted. While these mechanisms and conventional designs permit some reasonable degree of conformity to typical body movements, they are in many respects deficient.

For example, the above-described armrests typically are of limited use to, and may even be uncomfortable for, a reclined user. That is, while the upwardly facing support surface on each armrest does remain accessible, conventional adjustment mechanisms do not allow the armrest to reposition so as to conformingly support a reclined user's arm that may be turned in multiple directions as permitted through the elbow and shoulder joints. For example, a reclined user attempting to hold a book, magazine, or electronic device in a raised position typically will get limited benefit from the armrest only by leaning his/her elbow or upper arm region on the edge of the arm support. This leaves the forearm region virtually unsupported which may lead to rapid fatigue.

With respect to the back rest, typically, the horizontal pivot axis will be at a location spaced from the region at the lower region of a user's back where the upper and lower parts of the body naturally hinge. As a result, as a user moves between reclined and upright positions, the user's back will slide relative to the back rest. The user's back thus is in different relationships with the back rest as he/she hinges his/her upper body. When this occurs, the user must either make a compensating movement once the desired back rest angle is achieved, or settle for a less than optimal relationship between the user's back and head and the back rest. This might be particularly a problem when back rests are designed for a specific and consistent relationship between a user's head and back.

Additional conformity problems are introduced when the seat incorporates an angular adjustment capability independently of the back rest or somehow in synchronization therewith. Aside from the inconvenience of having to adjust and shift, the user faces the possibility that no relationship between the seat and back rest will be achievable that allows comfortable conformity to a user with his/her body in different states.

Many of the above limitations with conventional mechanisms are experienced with other categories of articles with relatively movable parts. This includes articles that are not required to conform to human anatomy but require strategic relative movement between parts.

For example, complicated mechanisms are often incorporated to allow tables to be collapsed. Leg assemblies are integrated into table tops so that the legs generally pivot around a fixed axis with control and stability afforded by pivotably connected linkage parts.

Some designs for relatively movable parts incorporate ball-and-socket arrangements which allow universal relative movement between parts. Ball-and-socket connections, while effective in allowing universal movement between two parts, have a number of drawbacks.

First of all, the forces exerted on the surfaces cooperating between ball-and-socket components may be very substantial, particularly when the components themselves are heavy and/or there is significant loading on one or more of the relatively movable parts in use. To maintain stability for this type of article, it may be necessary to make parts with high load capacity, which may add to the design complication, expense, and unwanted weight. This type of design also may be prone to excessive wear, given the concentration of forces between the engaging surfaces on components between which there is relative movement. As a result, ongoing maintenance, such as lubrication, may be required. Alternatively, parts may have to be periodically changed as they wear and become less easily operable or wear to the point that alignment is altered or there is a malfunction.

Further, with a ball-and-socket type arrangement, it is generally difficult to lock the cooperating components together to avoid relative movement between the associated parts, particularly when the parts are subjected to relatively large operating forces. Thus, there is a tendency of the parts to slip, which again leads to potential wear and parts failure. Alternatively, the parts can be made to be more robust, as described above, which can lead to added expense, size, and weight.

As a result, it is not practical in many applications for purveyors to offer articles with universal-type joints to permit the optimal relative movement between parts. Thus, the user generally is faced with options, each of which involves compromise on some level. For example, with existing adjustable furniture, users generally contend with linkages that are designed for durability yet which will not permit comfortable conformance to various torso and limb movements. Lighter-duty products with such universal adjustment capability are typically either undesirably expensive or made with the anticipation that they will be repaired or placed on a fairly regular basis.

Many industries, including the furniture industry, continue to seek out designs that accommodate relative movement between parts that are optimal in terms of permitted adjusting movements, affordability, and adequate life cycle.

SUMMARY OF THE INVENTION

In one form, the invention is directed to a system that makes up at least a portion of a utilitarian article. The system has a first body, a second body, and a first linkage assembly acting between the first and second bodies and configured to allow the first and second bodies to be relatively positioned to thereby reconfigure the article into which the system is incorporated. The first linkage assembly includes first and second linkage parts. The first linkage assembly is configured so that: a) the first linkage part is movable relative to the first body around a first axis; b) the second linkage part is movable relative to the first linkage part around a second axis; and c) the second linkage part is movable relative to the second body around a third axis. At least one of the first, second, and third axes is non-parallel to the other two of the first, second, and third axes.

In one form, no one of the first, second, and third axes is substantially perpendicular to any other of the first, second, and third axes.

In one form, the first, second, and third axes are in non-parallel relationship, each to the other, and converge to approximately a single point.

In one form, the first, second, and third axes converge towards a first location and the first and second linkage parts do not extend fully to the first location.

In one form, the first and second linkage parts each comprises a substantially flat panel.

In one form, the first and second linkage parts each has a polygonal shape.

In one form, there is a live hinge that defines at least one of the first, second, and third axes.

In one form, there is a third linkage part that connects between, and is movable relative to each of, the first and second bodies.

In one form, the third linkage part is movable relative to each of the first and second bodies around separate axes.

In one form, the utilitarian article is a chair.

In one form, the chair has a seat and additionally at least one of: a) a back rest; b) an armrest; c) a base; and d) a head rest. The first body defines at least a part of one of the seat, back rest, armrest, base, and head rest. The second body defines at least a part of another one of the seat, back rest, armrest, base, and head rest.

In one form, the system has a second linkage assembly acting between the first and second bodies and configured to allow the first and second bodies to be relatively positioned to thereby reconfigure the chair. The second linkage assembly has third and fourth linkage parts. The second linkage assembly is configured so that: a) the third linkage part is movable relative to the first body around a fourth axis; b) the fourth linkage part is movable relative to the third linkage part around a fifth axis; and c) the fourth linkage part is movable relative to the second body around a sixth axis.

In one form, three of the first, second, third, fourth, fifth, and sixth axes converge generally to a single first point and the other three of the first, second, third, fourth, fifth, and sixth axes converge generally to a single second point.

In one form, the single first and second points are at substantially the same location.

In one form, the chair incorporates a plurality of the systems as described above.

In one form, the system further includes a structure configured to selectively and releasably fix movement of at least one of: a) the first linkage part relative to the first body around the first axis; b) the second linkage part relative to the first linkage part around the second axis; and c) the second linkage part relative to the second body around the third axis.

In one form, the system further includes a mechanism for generating a force tending to cause relative movement between at least one of: a) the first linkage part and first body around the first axis; b) the second linkage part and first linkage part around the second axis; and c) the second linkage part and second body around the third axis.

In one form, one of the first, second, and third axes defined by the first linkage assembly is a shared axis with one of the fourth, fifth, and sixth axes defined by the second linkage assembly.

In one form, the first and second bodies and the first, second, third, and fourth linkage parts cooperatively extend continuously around an opening.

In one form, one of the first and second bodies and first and second linkage parts on one of the plurality of systems is connected to one of the first and second bodies and first and second linkage parts on another of the plurality of systems to cause the one of the first and second bodies and first and second linkage parts on the one of the plurality of systems to move as an incident of the one of the first and second bodies and first and second linkage parts on the another of the plurality of systems moving.

DETAILED DESCRIPTION OF THE PREFERRED EMBODIMENT

Figure 1:
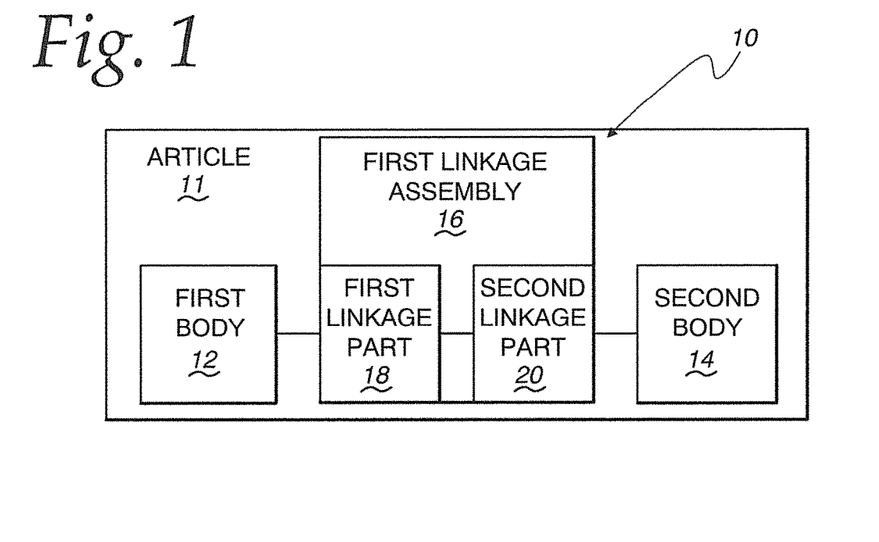
FIG. 1 is a schematic representation of a utilitarian article with a system, according to the present invention, that makes up at least a portion of the article and is made up of a first linkage assembly acting between first and second bodies on the article.

Referring initially to FIG. 1, a system, according to the invention, is shown at 10 that makes up at least a portion of a utilitarian article 11. The schematic showing in FIG. 1 is intended to encompass virtually any type of utilitarian article in which a first body/body part 12 is required to be moved in a controlled/controllable fashion relative to a second body/body part 14. As but examples, the utilitarian article 11 may be one in the furniture industry, one in the lighting industry, one in the electronics industry, etc.

A first linkage assembly 16 acts between the first and second bodies/body parts 12, 14 and is configured to allow the first and second bodies/body parts 12, 14 to be relatively repositioned to thereby reconfigure the article.

In one preferred form, the first linkage assembly 16 consists of first and second linkage parts 18, 20. In this particular preferred form, the first linkage part 18 is movable relative to the first body/body part 12 around a first axis. The second linkage part 20 is movable relative to the first linkage part 18 around a second axis. The second linkage part 20 is movable relative to the second body/body part 14 around a third axis.

The relationship between the bodies/body parts 12, 14 and linkage parts 18, 20 is such that the combined structure has characteristics of a gimbal- or other universal-type connection.

The schematic showing in FIG. 1 is intended to encompass the particular embodiments described hereinbelow and virtually an unlimited number of variations thereof that might be derived therefrom with the inventive teachings in hand.

Figure 2:
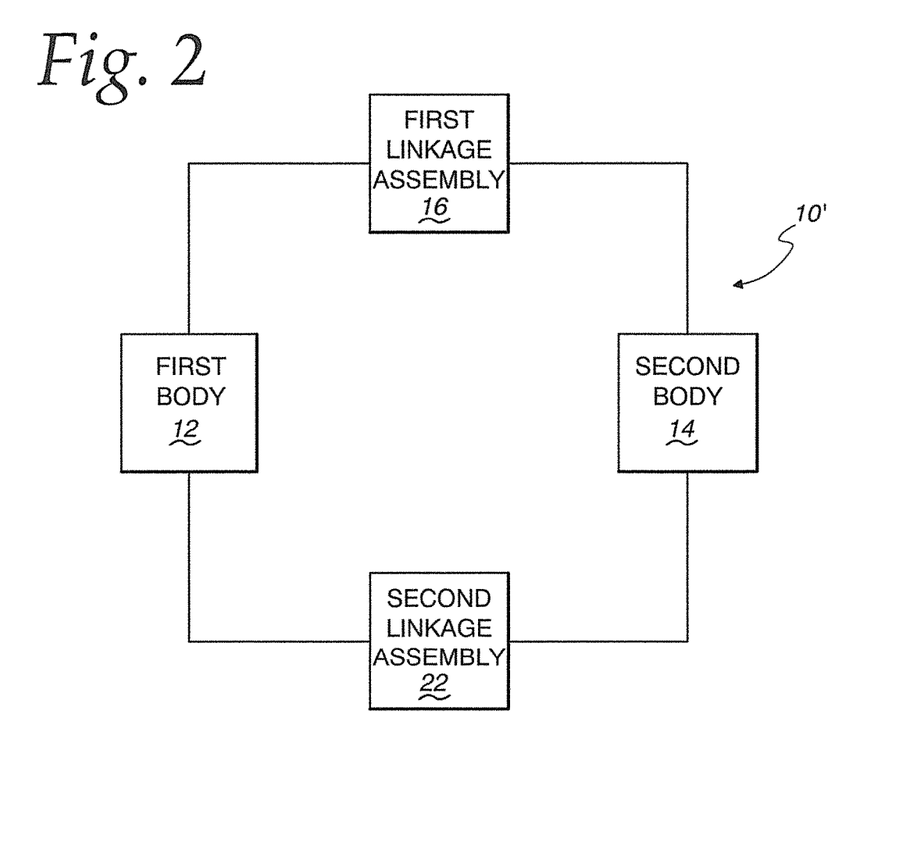
FIG. 2 is a schematic representation of a modified form of the inventive system wherein separate linkage assemblies interact between the first and second bodies.

In a modified form of system, as shown at 10' in FIG. 2, a second linkage assembly 22, having characteristics similar to those of the first linkage assembly 16, may act between the first and second bodies/body parts 12, 14.

Figure 3:
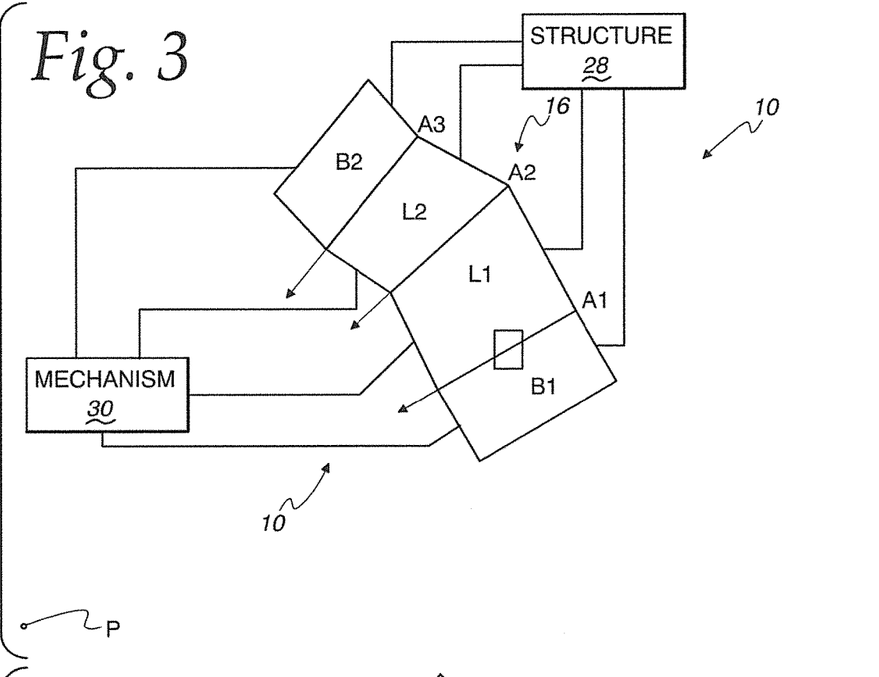
FIG. 3 is a perspective view of one form of system as shown schematically in FIG. 1.

In FIG. 3, and various Figures that follow, for purposes of clarity, the first and second bodies/body parts 12, 14, and additional bodies, will be identified as "B1", "B2", etc., with the first and second linkage parts 18, 20 similarly identified with a designation "L1, L2", etc.

The system 10 depicted in FIG. 3 is made from components that have the shape of joined panels. In this embodiment, the first and second bodies B1, B2 and first and second linkage parts L1, L2 each is shown as a substantially flat panel with a polygonal shape. It is not required that these components be either flat or polygonal in shape.

One or more relatively narrow, elongate components might be utilized in place of each panel shape, with the ends of the elongate components connected for pivoting movement relative to an adjacent/cooperating component.

The panel shapes need not be flat or uninterrupted in the full area between the components between which they interact. As but one example, the panel shapes may be bowed or otherwise contoured. Openings/cutouts and arbitrary edge shapes may be formed in the panels. Principally the use of a "panel" is intended to allow guided movement between cooperating components while adding a desired degree of stability therebetween, without limitation as to how the panel is precisely shaped. For simplicity, the panels depicted have polygonal shapes.

In FIG. 3, the first linkage assembly 16 on the system 10 includes the first linkage part L1 that is movable relative to the first body B1 around a first axis A1. The second linkage part L2 is movable relative to the first linkage part L1 around a second axis A2. The second linkage part L2 is movable relative to the second body B2 around a third axis A3.

In one form, at least one of the first, second, and third axes A1, A2, A3 is non-parallel to the other two of the first, second, and third axes A1, A2, A3.

In one preferred form, though not required, no one of the first, second, and third axes A1, A2, A3 is substantially perpendicular to any other of the first, second, and third axes A1, A2, A3.

As depicted, the first, second, and third axes A1, A2, A3 are in non-parallel relationship, each to the other, and converge to approximately a single point P. The system will work even if the axes A1, A2, A3 only generally converge to a point or area location. That is, the first, second, and third axes may converge towards a first location in the vicinity of the point P. In either embodiment, the linkage parts L1, L2 do not extend fully to the first location or point P. Thus, relative movement between components in a universal-type manner is permitted without constriction that would occur with extension of the linkage parts L1, L2 fully to the first location or point P.

Figure 4:
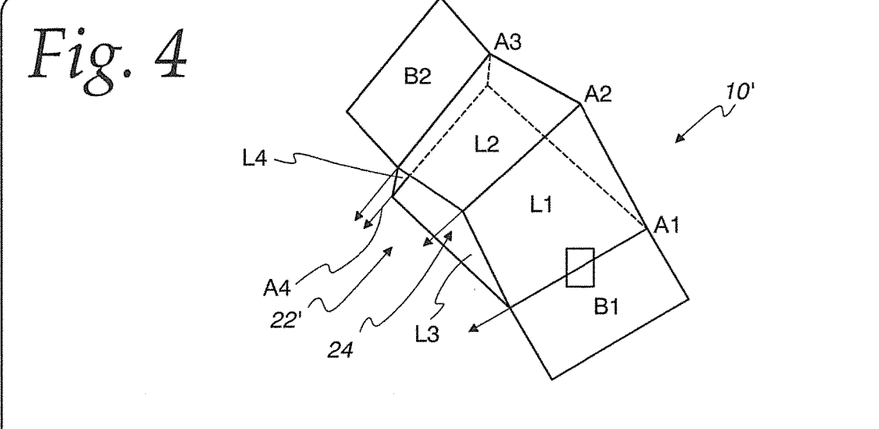
FIG. 4 is a view as in FIG. 3 of a modified form of system.

FIG. 4 shows a system 10', that is a variation of the system 10, to include a second linkage assembly 22' made up of linkage parts L3, L4 connecting between the bodies B1, B2. The linkage part L3 shares the axis A1 with the linkage part L1, with the linkage part L4 sharing the axis A3 with the linkage part L2. The linkage parts L3, L4 are movable relative to each other around an axis A4. The axes A1, A3, A4 converge to a single point P1 or towards a first location in the vicinity thereof. In this embodiment, the linkage parts L1, L2, L3, L4 extend continuously around an opening 24.

Figure 5:
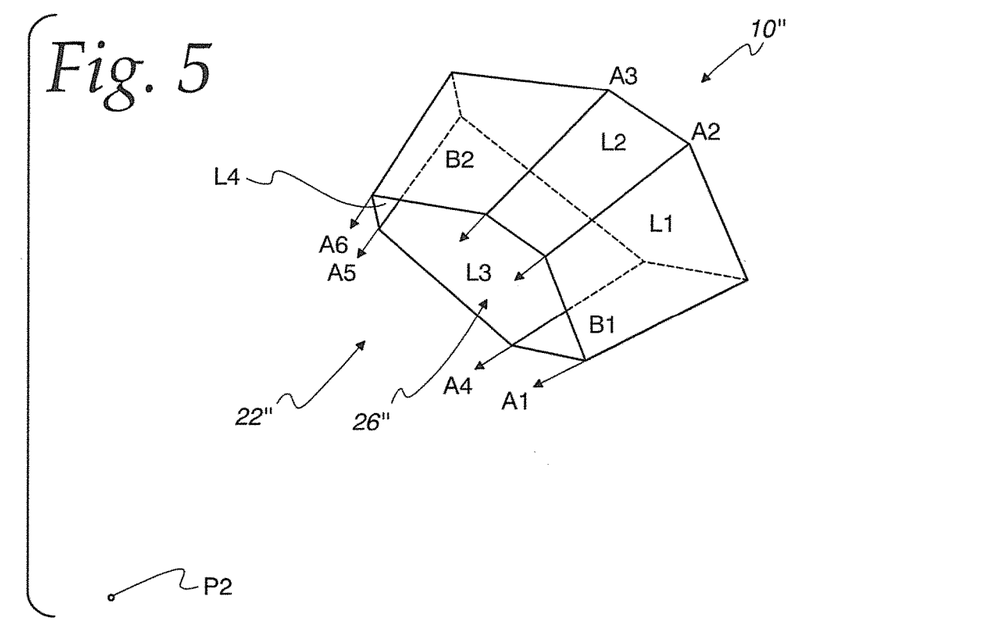
FIG. 5 is a view as in FIG. 4 of a still further modified form of system.

A variation of the system 10' is shown at 10" in FIG. 5. In this embodiment, the basic components of FIG. 3 incorporate a second linkage assembly 22" consisting of linkage parts L3, L4 acting between the bodies B1, B2. The linkage part L3 is movable relative to the body B1 around an axis A4, with linkage part L3 movable relative to the linkage part L4 around an axis A5. Linkage part L4 is in turn movable relative to the second body B2 around an axis A6. All axes A1-A6 may converge to a single point P2 or towards a location in the vicinity of the single point P2.

Alternatively, less than all of the axes A1-A6 may converge to the single point P2 or towards a location in the vicinity of the single point P2. Different movements occurring between the body parts B1, B2 may be selectively changed by controllably changing the converging arrangements of axes A1-A6. For example, axes A1, A2, A3 can generally converge towards one location with axes A4, A5, A6 converging towards the one or a different location.

In another variation, axes A3, A6 can converge while axes A4, A5 converge and axes A1, A2 converge.

In a further variation, axes A1, A4 can converge while axes A5, A6 converge and axes A2, A3 converge.

The components L1, L2, L3, L4 and B1, B2 in each configuration extend continuously around a space/opening 26".

As depicted in FIG. 3, structure shown generically at 28, that might be incorporated into any embodiment herein between any cooperating body parts and linkage parts, is configured to selectively and releasably fix movement of at least one of: a) the first linkage part L1 relative to the first body part B1 around the first axis A1; b) the second linkage part L2 relative to the first linkage part L1 around the second axis A2; and c) the second linkage part L2 relative to the second body part B2 around the third axis A3. Individual fixing and releasing of some or all of the relatively movable linkage and body parts may be permitted or a synchronized control of the same may be accomplished through the structure 28.

The structure 28 may require manual release between all components—linkage parts and bodies. Alternatively, the components may release under a predetermined force. The force at which release of different components occurs may vary to add another dimension to the design.

As further shown in FIG. 3, a mechanism 30, also depicted schematically, can act between the components L1, L2, B1, B2, and likewise between cooperating linkage and body parts in any embodiment herein, to generate a force tending to cause relative movement between at least one of: a) the first linkage part L1 and first body B1 around the first axis A1; b) the second linkage part L2 and first linkage part L1 around the second axis A2; and c) the second linkage part L2 and second body B2 around the third axis A3. The force application may be selected to substantially fix components or allow controlled movement of components as an application may dictate. Uniform or different force magnitude may be applied between components throughout an article.

Through the structure 28 and mechanism 30, the user can strategically control the relative positions of the bodies B1, B2 as they reorient and potentially releasably fix the bodies B1, B2 in a desired relationship. Alternatively, the bodies may remain free to move in a controlled manner dictated by how operating forces are applied.

Depending upon the nature of the structure 28 and mechanism 30, the double-sided arrangements shown in FIGS. 4 and 5, and other Figures herein, which afford stability and "disciplined" relative movement between the bodies B1, B2, may be made into single-sided arrangements, as shown in FIG. 3, without loss of control/stability.

Figure 6:
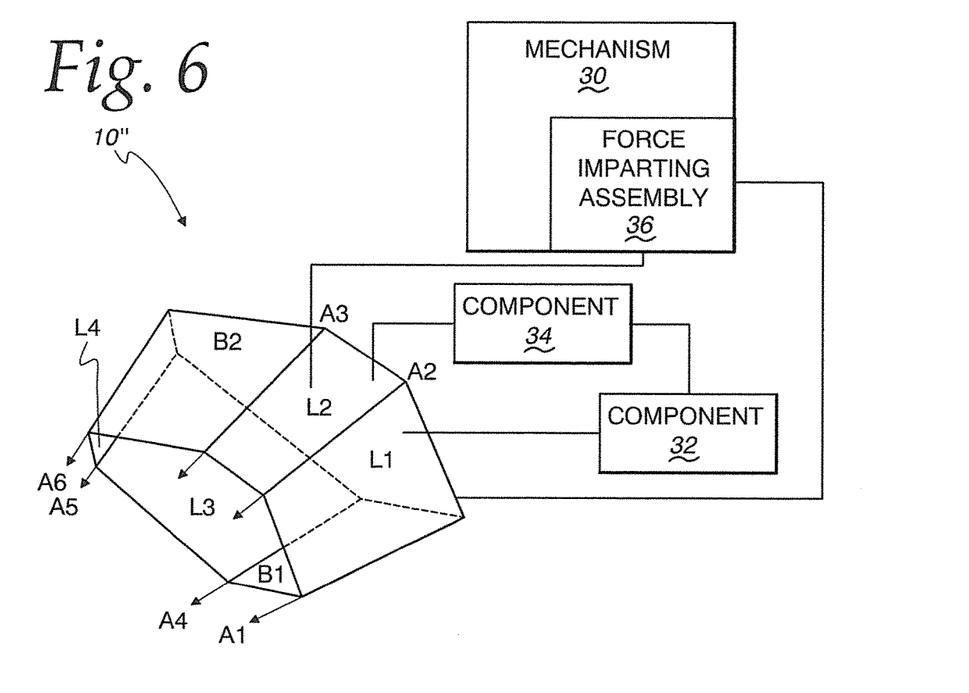
FIG. 6 is a view as in FIG. 5 and schematically showing structure for controlling interaction of components on the system.

As shown for the exemplary system 10" in FIG. 6, exemplary components 32, 34 may be provided between any of the cooperating components of any of the embodiments herein. In FIG. 6, the components 32, 34 act between the first and second linkage parts L1, L2. The components 32, 34 may act as positioning components and may be in the form of spring-type structures. For example, a torsion spring or a composite spring might be utilized to exert a force between any of the components that move relative to each other around an axis. The components 32, 34 may be made with a constant or variable force imparting capability.

Alternatively, the aforementioned mechanism 30, as shown cooperating between exemplary linkage parts L1, L2 in FIG. 6, may consist of a force imparting assembly 36 capable of changing the relationship of any two components that move relative to each other around an axis. The force imparting assembly 36 may be manually controlled or may automatically operate in response to a user stimulus or input, as mentioned above.

The structure 28 may be made up of any of virtually an unlimited number of different components that releasably fix, or control movement of, parts that are otherwise freely movable relative to each other. Locking and unlocking between any components may be effected using, as examples, one or more of a clutch, disk brake, cam lock, damper or shock, electromechanical or electronic components, expanding pin in a socket, actuator, pin/rod sliding into a slot to lock rotations, servos, hand wheel, motor, etc. All of these devices and others are contemplated within the generic showing. As noted, the locking and unlocking can be manually done individually or collectively or may be carried out in response to a user stimulus, either individually or in a synchronized manner.

Figure 7:
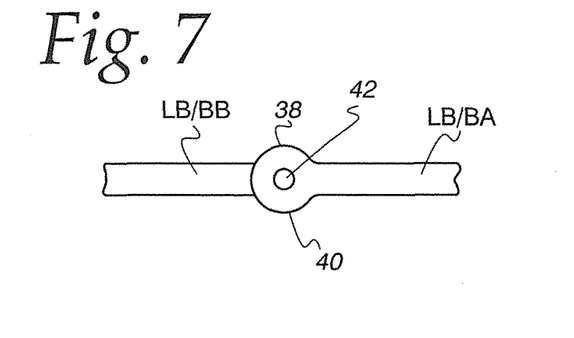
FIG. 7 is an enlarged, fragmentary view showing one form of pivot connection between components on the systems in FIGS. 3-6.

The pivoting connection at the various axes can be defined by any different mechanisms well known to those in this art. For example, as shown in FIG. 7, linkage parts LA, LB or body parts BA, BB may be joined through separate hinge parts 38, 40, respectively on the components LB/BB and LA/BA. The hinge parts are joined through a pin 42.

Figure 8:
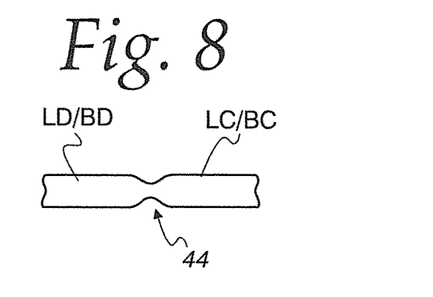
FIG. 8 is a view as in FIG. 7 of a modified form of pivot connection.

Alternatively, as shown in FIG. 8, a live hinge arrangement 44 can be made between linkage parts LC, LD or body parts BC, BD. The live hinge at 44 may result from a localized thinning of the particular material or may be otherwise defined.

All components may be made from virtually any material, such as plastic, metal, composite, etc. Other hinge arrangements are contemplated with the depicted arrangements being exemplary in nature only.

The various components, such as the bodies and linkage parts, can be made rigid, flexible, or semi-flexible. For example, exemplary components B1, L1 may be made flexible or semi-flexible in nature with the same or different construction.

Figure 9:
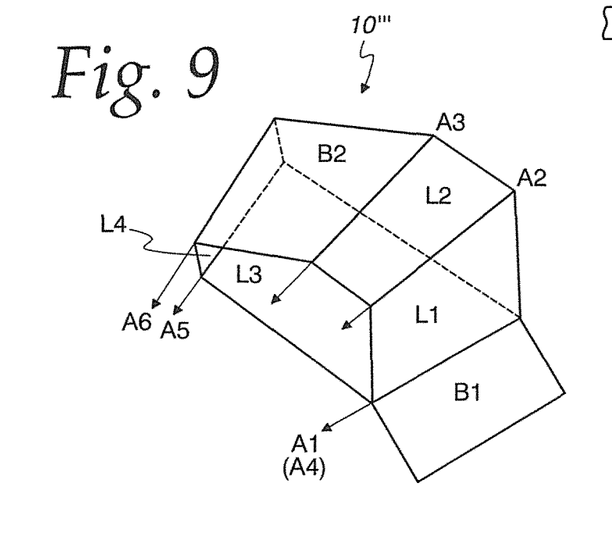
FIG. 9 is a view as in FIG. 5 of a further modified form of system.

FIG. 9 depicts another form of system, according to the invention, at $10'''$. The system incorporates linkage parts L1, L2, L3, L4 and bodies B1, B2 as in the system 10" depicted in FIGS. 5 and 6. The axes A1, A4 are the same axis.

With this system, it is contemplated that all axes (A1-A6) converge generally at a point or location. In an alternative form, axes A5, A6 do not generally converge with axes A2, A3.

Figure 10:
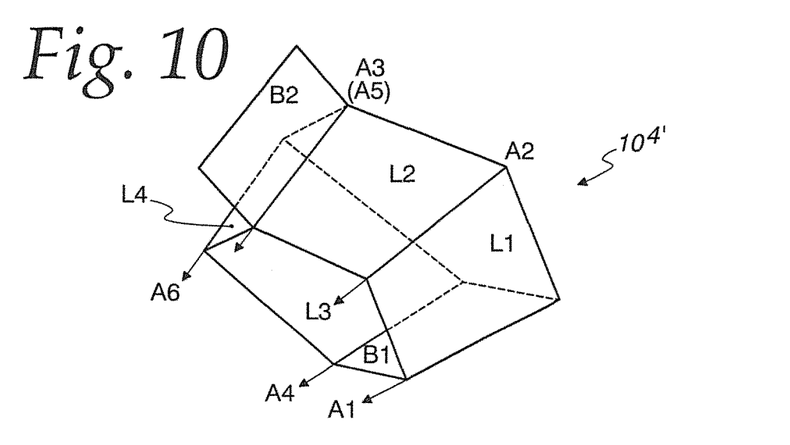
FIG. 10 is a view as in FIG. 9 of a still further modified form of system.

In FIG. 10, a further modified form of system is shown at $10^{4'}$. In this embodiment, the axes A3, A5, corresponding to the axes A3, A5 in the system 10", are the same axis.

With this embodiment, all axes (A1-A6) generally converge to a point or location. Alternatively, axes A4, A5 do not generally converge with axes A1, A2.

Figure 11:
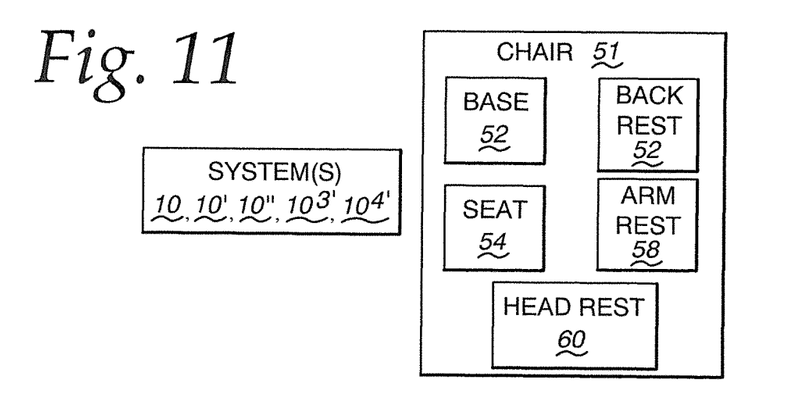
FIG. 11 is a schematic representation of a chair, that is one form of utilitarian article as depicted schematically in FIG. 1, into which the inventive system is incorporated.

The systems 10, 10', 10", $10'''$, $10^{4'}$ will now be described as incorporated into an exemplary piece of furniture, shown schematically in FIG. 11, in the form of a chair 51. The chair 51 is intended to generically cover virtually all chair constructions, from those consisting simply of a base 52 and a seat 54 on the base, to a design having any one or more of a back rest 56, armrest 58, and head rest 60. The invention contemplates using any form of the systems 10, 10', 10", $10'''$, $10^{4'}$, or others, acting directly or indirectly between any two of the base 52, seat 54, back rest 56, armrest 58, and head rest 60. The systems 10, 10', 10", $10'''$, $10^{4'}$ may act directly between any two of the base 52, seat 54, back rest 56, armrest 58, and head rest 60 or indirectly in a manner whereby the systems 10, 10', 10", $10'''$, $10^{4'}$, or parts thereof, act against and/or between other systems 10, 10', 10", $10'''$, $10^{4'}$. One system may share a body or a linkage part with another system. The systems may interact so that a shared linkage part or body has the same axes for both systems. Alternatively, a linkage part or body may be joined to a linkage part or body so as to produce an additional pivot axis.

In the following drawings, the linkage parts and bodies will be identified with numbers corresponding to those used in the various Figures, above, showing the systems 10, 10', 10", $10'''$, $10^{4'}$.

Figure 12:
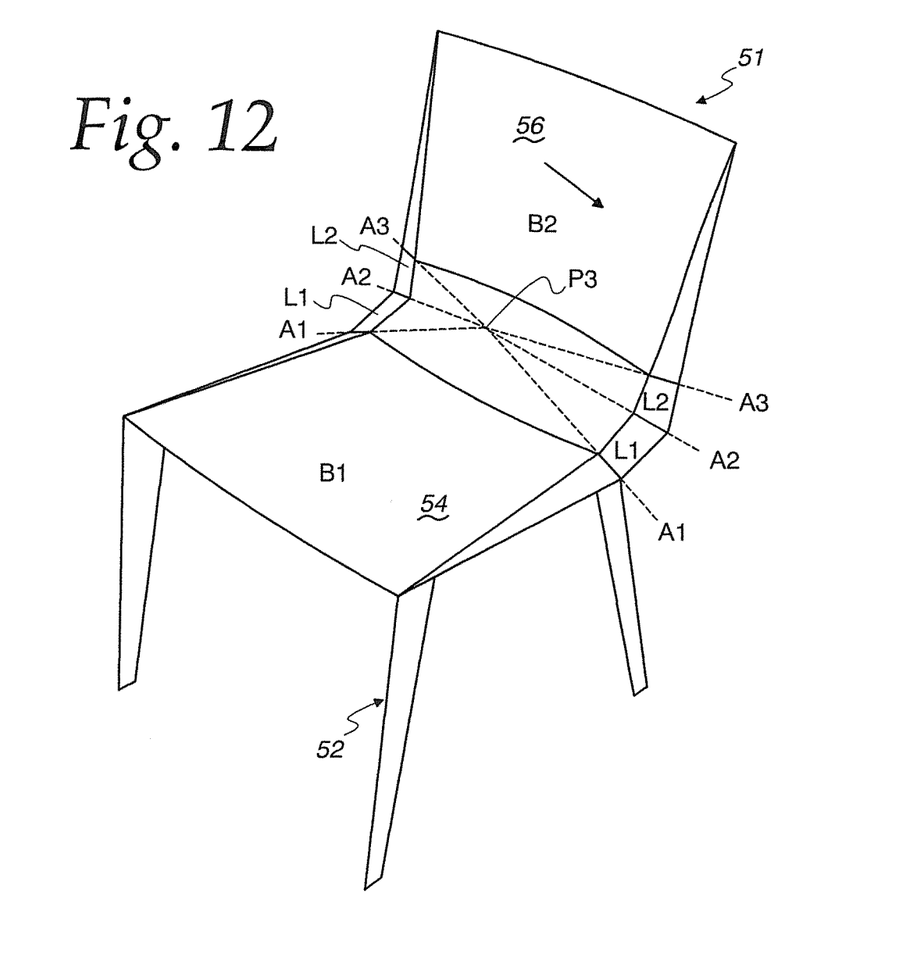
FIG. 12 is a perspective view of one specific form of chair incorporating the inventive system.

In FIG. 12, a chair 51 is shown with a back rest 56, base 52, and seat 54, with the seat 54 corresponding to the body B1 and the back rest 56 corresponding to the body B2.

Two separate systems are incorporated into the chair 51, including linkage parts L1, L2 at each side of the chair between the seat 54 and back rest 56 to allow the chair 51, in its operative state, to reconfigure to conform to an occupant's movements while seated in the chair.

In this embodiment, the axes A1, A2, A3 associated with each system converge at/towards a point P3. P3 is at the lumbar or spine area of the human back of an occupant of the chair 51.

It is not necessary that the axes A1-A3 meet at a single point, nor is it a requirement that the angles between the axes A1, A2 be the same as the angle between the axes A2, A3.

Figure 13:
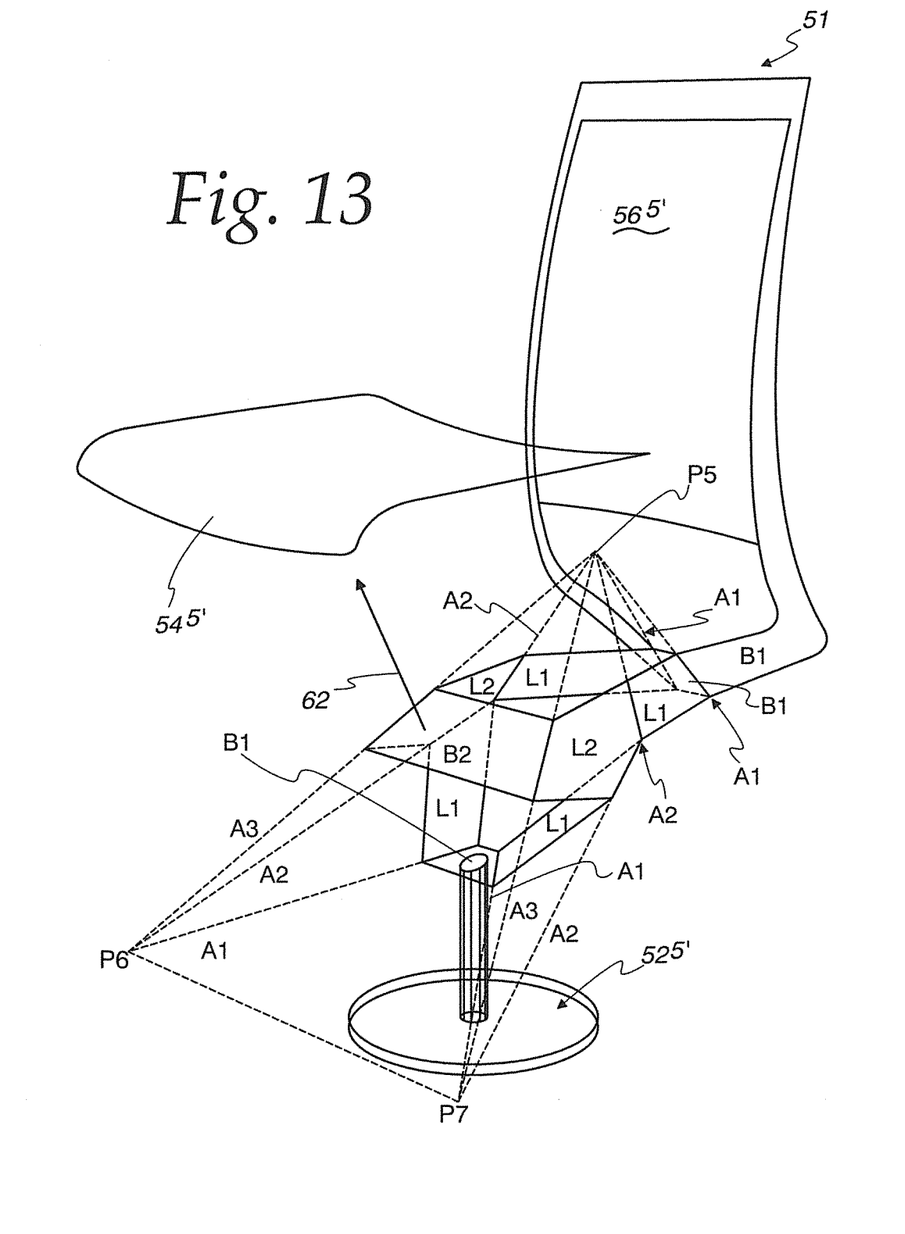
FIG. 13 is a perspective view of a modified form of chair incorporating the inventive system.
Figure 14:
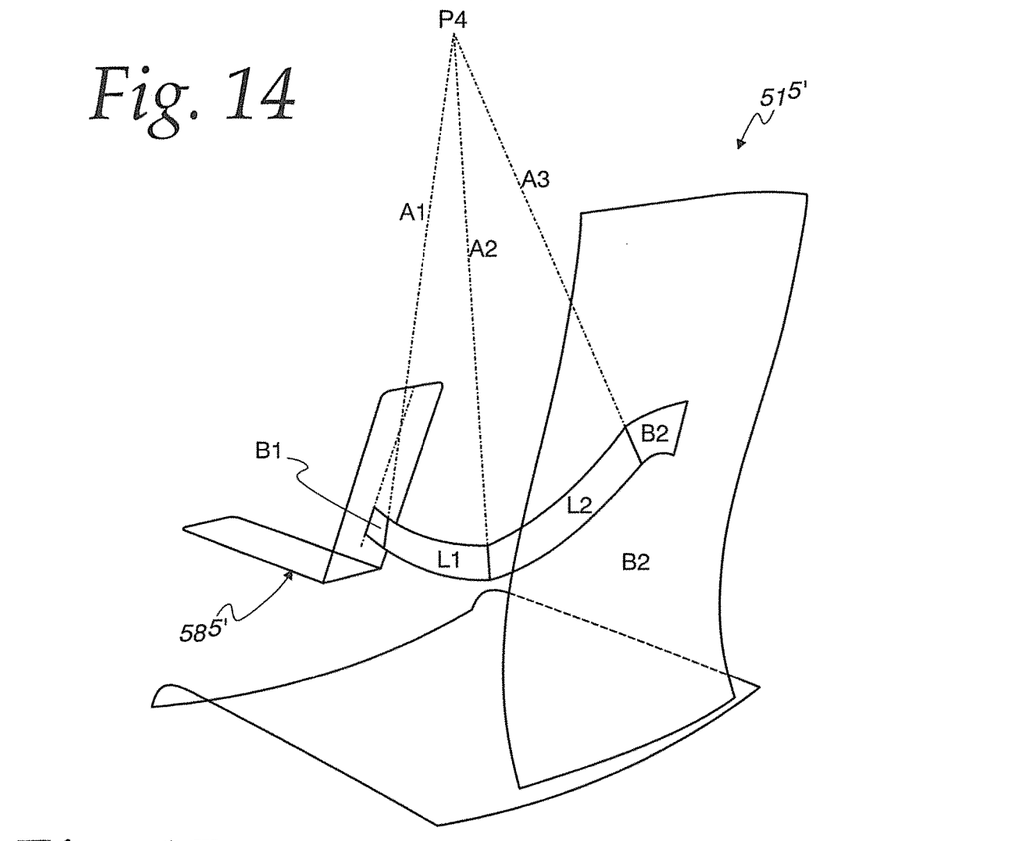
FIG. 14 is a view of the chair in FIG. 13 from a different perspective and showing another system for supporting an armrest.

Another form of chair is shown at 51⁵' in FIGS. 13 and 14. The chair 51⁵' has a base 52⁵', a seat 54⁵', a back rest 56⁵', and an armrest 58⁵'. Linkage parts, bodies, and axes are identified correspondingly as in the earlier described embodiments.

As seen at FIG. 14, the armrest 58⁵' incorporates a system wherein link parts L1, L2 converge at least generally towards a point P4 above the height of the chair.

In FIG. 13, the seat 54⁵' is shown in two parts, with the main seating part being moved away from the system body B2, as indicated by the arrow 62.

In this embodiment, multiple of the systems have axes that converge generally towards a hip location for an occupant of the chair, as indicated at P5.

Separate systems have axes that converge generally towards ankle locations P6, P7, spaced laterally of the chair.

Each of the points P-P7 represents the pivot location for a respective system 10, 10', 10", 10"', 10⁴'.

The construction of the chair 51⁵' represents one possible combination of systems to produce a controlled movement of the chair parts through strategic incorporation of the systems, selection of their particular configurations, and interaction with the basic chair components and other systems.

In this embodiment, the A3 axis is shared with the ankle and hip positions P3, P4 and P2, respectively.

As mentioned above, the systems 10 are strategically incorporated to achieve a desired guided movement of the chair parts. The interaction of the systems may involve pivotably interconnecting linkage parts and bodies on cooperating assemblies in a manner whereby there is a sharing of pivot axes. Alternatively, assemblies could be interconnected so that a linkage part on one assembly is connected to a linkage part on another assembly for relative pivoting movement at a location that is not coincident with an axis of that linkage part.

Figure 15:
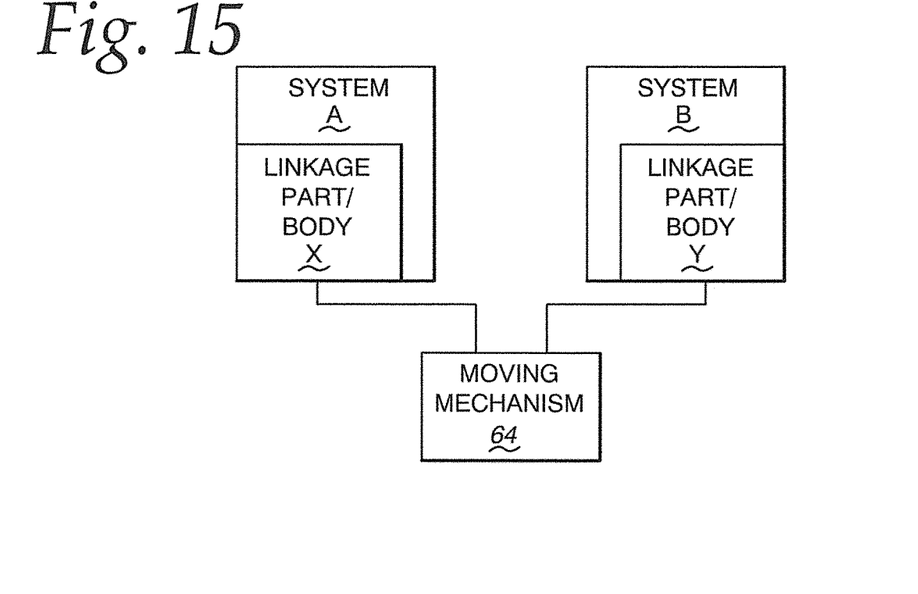
FIG. 15 is a schematic representation of a moving mechanism for interconnecting components on separate systems incorporated into a single utilitarian article.

As depicted in FIG. 15, a moving mechanism at 64 may interact between a linkage part/body X on one system A and a linkage part/body Y on a separate system B. Through the moving mechanism, one of the linkage parts/bodies X may be controllably repositioned relative to a linkage part/body Y through the movement mechanism 64 to achieve another dimension of movement.

The foregoing disclosure of specific embodiments is intended to be illustrative of the broad concepts comprehended by the invention.

The invention claimed is:

1. A system that makes up at least a portion of a chair that comprises a combination of relatively movable components, the relatively movable components comprising one of: a) at least two of: i) a seat; ii) a back rest; iii) an armrest; iv) a head rest; and v) a base; and b) separate parts of at least one of i)-v), the chair having an operative state wherein a person can assume an elevated, supported, sitting position on the seat and at least one of: A) lean his/her back against the back rest while sitting on the seat; B) lean his/her arm against the armrest while sitting on the seat; and C) lean his/her head against the head rest while sitting on the seat in the event that the chair has at least one of a back rest, a head rest, and an armrest, the system comprising:

a first body associated with one of the relatively movable components;

a second body associated with another of the movable components; and a first linkage assembly acting between the first and second bodies and configured to allow the first and second bodies to be relatively positioned to thereby allow the first and second components to move relative to each other with the chair maintained in the operative state, wherein the first linkage assembly comprises first and second linkage parts, the first linkage assembly configured so that: a) the first linkage part is movable relative to the first body around a first axis; b) the second linkage part is movable relative to the first linkage part around a second axis; and c) the second linkage part is movable relative to the second body around a third axis, at least one of the first, second, and third axes being non-parallel to the other two of the first, second, and third axes.

2. The system according to claim 1 wherein no one of the first, second, and third axes is substantially perpendicular to any other of the first, second, and third axes.

3. The system according to claim 2 wherein the first, second, and third axes are in non-parallel relationship, each to the other, and converge to approximately a single point.

4. The system according to claim 2 wherein the first, second, and third axes converge towards a first location and the first and second linkage parts do not extend fully to the first location.

5. The system according to claim 1 wherein the first and second linkage parts each comprises a substantially flat panel.

6. The system according to claim 1 wherein the first and second linkage parts each has a polygonal shape.

7. The system according to claim 1 wherein there is a live hinge that defines at least one of the first, second, and third axes.

8. The system according to claim 1 wherein there is a third linkage part that connects between, and is movable relative to each of, the first and second bodies.

9. The system according to claim 8 wherein the third linkage part is movable relative to each of the first and second bodies around separate axes.

10. The system according to claim 1 wherein the chair has a seat and additionally at least one of: a) a back rest; b) an armrest; c) a base; and d) a head rest, and the first body defines at least a part of one of the seat, back rest, armrest, base, and head rest and the second body defines at least a part of another one of the seat, back rest, armrest, base, and head rest.

11. The system according to claim 1 wherein the system comprises a second linkage assembly acting between the first and second bodies and configured to allow the first and second bodies to be relatively positioned to thereby reconfigure the chair, the second linkage assembly comprising third and fourth linkage parts, the second linkage assembly configured so that: a) the third linkage part is movable relative to the first body around a fourth axis; b) the fourth linkage part is movable relative to the third linkage part around a fifth axis; and c) the fourth linkage part is movable relative to the second body around a sixth axis.

12. The system according to claim 11 wherein three of the first, second, third, fourth, fifth, and sixth axes converge generally to a single first point and the other three of the first, second, third, fourth, fifth, and sixth axes converge generally to a single second point.

13. The system according to claim 12 wherein the single first and second points are at substantially a same location.

14. The system according to claim 11 wherein the chair comprises a plurality of the systems as recited in claim 1.

15. The system according to claim 11 wherein one of the first, second, and third axes defined by the first linkage assembly is a shared axis with one of the fourth, fifth, and sixth axes defined by the second linkage assembly.

16. The system according to claim 11 wherein the first and second bodies and the first, second, third, and fourth linkage parts cooperatively extend continuously around an opening.

17. The system according to claim 11 wherein one of the first and second bodies and first and second linkage parts on one of the plurality of systems is connected to one of the first and second bodies and first and second linkage parts on another of the plurality of systems to cause the one of the first and second bodies and first and second linkage parts on the one of the plurality of systems to move as an incident of the one of the first and second bodies and first and second linkage parts on the another of the plurality of systems moving.

18. The system according to claim 1 wherein the system further comprises a structure configured to selectively and releasably fix movement of at least one of: a) the first linkage part relative to the first body around the first axis; b) the second linkage part relative to the first linkage part around the second axis; and c) the second linkage part relative to the second body around the third axis.

19. The system according to claim 1 wherein the system further comprises a mechanism for generating a force tending to cause relative movement between at least one of: a) the first linkage part and first body around the first axis; b) the second linkage part and first linkage part around the second axis; and c) the second linkage part and second body around the third axis.

\* \* \* \* \*